United States Patent [19]
Smith

[11] 3,958,884
[45] May 25, 1976

[54] INTERFEROMETRIC APPARATUS

[75] Inventor: Francis Hughes Smith, York, England

[73] Assignee: Vickers Limited, London, England

[22] Filed: Apr. 16, 1975

[21] Appl. No.: 568,441

[30] Foreign Application Priority Data
Apr. 24, 1974 United Kingdom............... 18017/74

[52] U.S. Cl............................. 356/106 R; 356/109; 350/12
[51] Int. Cl.².................... G01B 9/02; G02B 21/06
[58] Field of Search ........... 356/106, 107, 108, 109, 356/110, 111, 112, 113; 350/12, 13

[56] References Cited
UNITED STATES PATENTS
2,911,880  11/1959  Rantsch ............................. 356/110
3,825,349  7/1974  Nomarski............................ 356/107

Primary Examiner—John K. Corbin
Assistant Examiner—Conrad Clark
Attorney, Agent, or Firm—Reed Smith Shaw & McClay

[57] ABSTRACT

An interferometric apparatus comprises an optical assembly which simultaneously directs two mutually coherent light pencils at different respective angles of incidence towards a point on a surface and receives the reflected light pencils therefrom. The assembly includes optical means bringing the reflected pencils at least partially into coincidence so that they can interfere optically in a manner varying with variation in the distance of points on the surface from a reference plane. The assembly may be combined with a microscope to form a "pupil-shearing micro-interferometer" for investigating surface topography.

16 Claims, 8 Drawing Figures

INTERFEROMETRIC APPARATUS

This invention relates to interferometric apparatus and is applicable, for example, to micro-interferometers.

Micro-interferometry can be employed for studying the topography of a surface in contactless manner. However, in the case of micro-interferometers requiring the presence of a reference surface, specially-designed interference objectives or specially-designed microscope stands fitted with matched pairs of objectives tend to be necessary in place of conventional microscope objectives and stands.

While differential interference systems are compatible with the use of conventional objectives and microscope stands, such systems provide the first derivative of a surface profile under examination; this derivative is not readily interpretable in terms of the actual surface profile, more especially where a quantitative evaluation is required.

Further, current micro-interferometers for the study of surface topographies tend to be sensitive to vibration and are often inapplicable to the examination of profile excursion greater than 50 micro-inches or so.

The present invention accordingly aims at providing interferometric apparatus which, when suitably incorporated in or combined with a microscope, makes it possible to avoid the limitations indicated above.

According to the present invention, there is provided interferometric apparatus including an optical assembly for simultaneously directing two mutually coherent light pencils at different respective angles of incidence towards a point on a surface under investigation and receiving reflected light pencils respectively produced by reflection of the two mutually coherent light pencils at that surface, the optical assembly including optical means for bringing the reflected light pencils at least partially into co-incidence with one another so that the reflected light pencils can interfere optically with one another in a manner which varies with variation in the distance of points on the surface from a reference plane.

In this context "coherent" is to be understood as applying not only to light pencils which are mutually coherent in the strictest sense, viz that they are directly capable of being made to interfere, but also to light pencils which are, so to speak, potentially coherent in the sense that when suitably polarized they are capable of being made to interfere.

It will thus be appreciated that if the incident light pencils, and thus the reflected light pencils, happen to be polarized in mutually orthogonal planes, respective components of the reflected light pencils that are to some extent polarized in a common plane will need to be produced in order to bring about actual interference between the reflected light pencils.

The optical means of the optical assembly may for example serve to bring the reflected light pencils at least partially into axial coincidence with one another (as regards their axes of travel, not necessarily as regards the optical axis of the assembly) so as to form a single light pencil in which interference effects can occur in dependence upon variation in the distance of points on the surface under investigation from a reference plane.

Interferometric apparatus embodying the invention may be incorporated in or combined with a microscope so as to form a pupil-shearing micro-interferometer. In such a case, for example, the two mutually coherent incident light pencils may be produced by amplitude-division of a single beam emanating from an illuminated aperture or other suitable light source. This division may for example be effected, in the course of the beam's passage towards a surface under investigation, by the optical means serving to bring into at least partial co-incidence with one another the two reflected light pencils produced by reflection of the two incident light pencils at the surface. The optical means employed for this purpose may for example comprise a Jamin interferometer plate or one or more bi-refrigent optical elements, for instance calcite plates or bi-refrigent doublets (e.g. doublet prisms or Savart doublet plates).

Reference will now be made, by way of example, to the accompanying diagrammatic drawings, in which.

Figure 1:
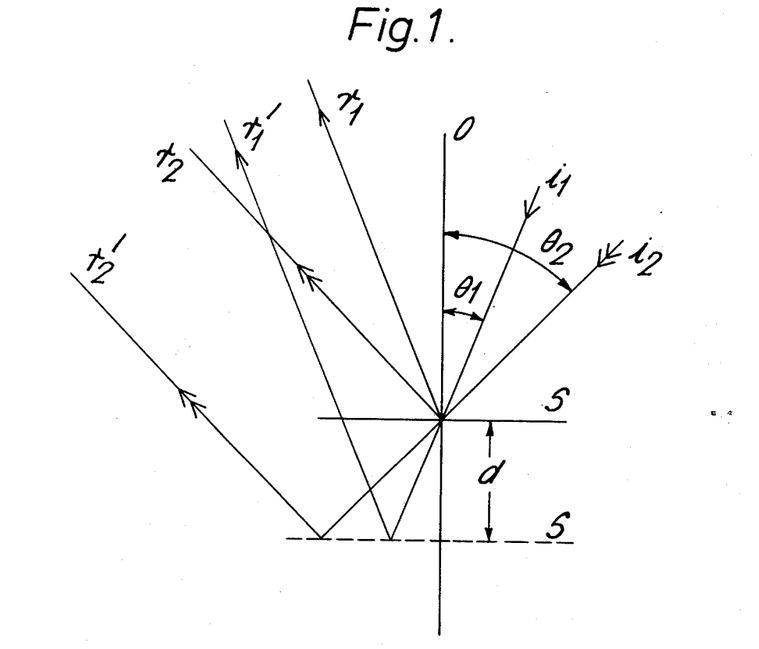
FIG. 1 illustrates the underlying theory of the present invention.

Turning first to FIG. 1, there is shown a plane reflecting surface S located at an upper position (indicated in full line) separated by a distance $d$ from a lower position of the surface (indicated in broken line). The surface S is normal to the optical axis O of interferometric apparatus arranged to illuminate the surface S with two coherent light pencils $i_1$ and $i_2$ respectively incident on the surface at two specified angles of incidence $\theta_1$ and $\theta_2$. Corresponding reflected light pencils $r_1$ and $r_2$ are produced by reflection of the incident pencils at the surface S. It can be shown that axial displacement of the surface S through the distance $d$ causes the optical path difference (o.p.d.) between the two reflected pencils $r_1$ and $r_2$ to change by an amount $\delta$ o.p.d. = 2nd $(\cos \theta_1 - \cos \theta_2)$, where $n$ is the refractive index of the medium through which the incident light pencils travel to the surface S and $\theta_1 < \theta_2$.

In principle, therefore, it is possible to determine the value of the axial displacement $d$ from interferometric measurement of $\delta$ o.p.d., provided that $\cos \theta_1$ and $\cos \theta_2$ are both known. The latter information is directly implicit in the two numerical apertures selected for the two incident light pencils.

Assuming that the interferometric apparatus directs the incident light pencils onto the surface S by means of an immersion objective of 1.3 numerical aperture (N.A.) which is so illuminated at its back focal plane that the numerical apertures associated with the two incident light pencils are 0.0 and 1.0, respectively, if the immersion medium has a refractive index $n$ of 1.524 then $\theta_1 = 0.0$ and $\theta_2 = 42.7°$. Accordingly, $\cos \theta_1 = 1.0$ and $\cos \theta_2 = 0.735$, making $\cos \theta_1 - \cos \theta_2 = 0.265$. The change $\delta$o.p.d. in optical path difference between the two reflected light pencils as a result of axial displacement of the reflecting surface S is therefore 0.805. In other words, an axial displacement of the surface S through one wavelength would cause an interferometric displacement of 0.8 of a fringe as compared with a corresponding value of 2 fringes for a conventional interferometric system employing a reference surface. It will be appreciated, however, that the wavelength and angles of incidence of the respective light pencils directed towards the surface S could be selected to provide a calibration factor suitable for a specific application.

Assuming, alternatively, that the interferometric apparatus has a dry 0.85 N.A. objective so illuminated that the numerical apertures associated with the two incident light pencils are respectively 0.0 and 0.71, then $\theta_1 = O$ and $\theta_2 = 45°$, so that $\cos \theta_1 = 1.0$ and $\cos \theta_2 = 0.71$. In these circumstances a calibration factor of 0.58 results.

Theoretically, it would be possible to attain a calibration factor of unity by using a "high-dry" objective if illuminated so that the numerical apertures of the two incident light pencils are respectively 0.0 and 0.87. In practice, however, reduction of the calibration factor may permit the investigation of coarser surface topgraphies than can be investigated with current interferometric methods.

The interferometric apparatus employed may take the form of a double-beam, common-path interferometer in which two light pencils are imaged upon spatially separated regions of the back focal plane of an objective, i.e. a pupil-shearing interferometer. In such a case, the two light pencils would, ideally, illuminate concentric annular regions of the objective's aperture, in the interests of symmetry and attainment of an optimum level of illumination. Conventional interferometric arrangements capable of imparting the radial form of shear required in this case are not necessarily suitable for present purposes, however, and accordingly interferometric arrangements imparting the more familiar, lateral form of pupil shear must be considered.

In the case of lateral pupil-shearing, the two coherent light pencils to be directed towards a surface under investigation are produced by two mutually coherent regions of illumination that are of substantially identical size and shape, these regions being formed by amplitude-division of an illuminating pencil with a wave-shearing beam-splitter. The formation of two such regions of identical size and shape appears to preclude the possibility of annular illumination, however. This would suggest confining illumination to virtual points respectively projected upon the appropriate annular zones of the objective's aperture so that the angles $\theta_1$ and $\theta_2$ are precisely defined. It should be noted, however, that the calibration expression $\delta$o.p.d. $= 2nd (\cos \theta_1 - \cos \theta_2)$ does not necessarily imply single, fixed values for $\theta_1$ and $\theta_2$. All that is required is that $(\cos \theta_1 - \cos \theta_2)$ should be substantially constant. Accordingly, it is not essential to confine the regions of illumination to the annular zones corresponding to the nominal values of $\theta_1$ and $\theta_2$. It is known that fringes appearing at a well-corrected objective's back focal plane when tested with a lateral shearing interferometer are approximately straight over a considerable length. This implies that slot-form illuminating apertures may possibly prove practicable.

Figure 2:
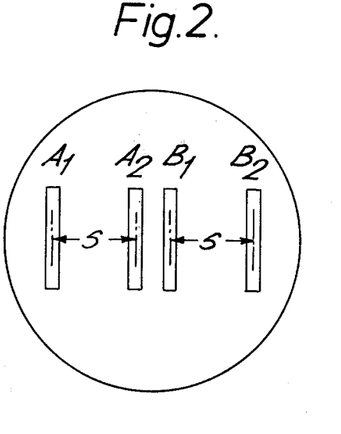
FIG. 2 illustrates the distribution of illumination over the back aperture of one form of pupil-shearing micro-interferometer embodying the invention.
Figure 3:
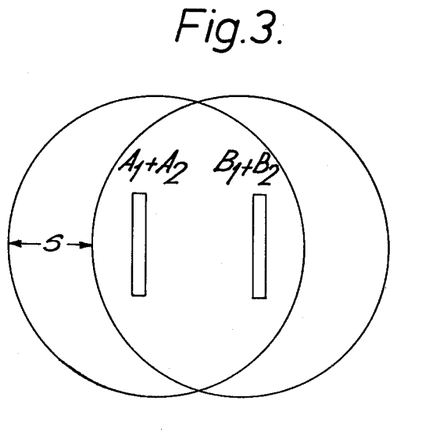
FIG. 3 illustrates the appearance of the back aperture as seen from the image plane after pupil shear has been effected in the micro-interferometer.

Considerations of symmetry argue the desirability of additionally directing a second pair of coherent light pencils at respective angles of incidence $\theta_1$ and $\theta_2$ in mirror-image relationship to the pair of incident light pencils mentioned above. This could be achieved by inserting between a light source and a wave-shearing beam-splitter a pair of adjacent illuminating apertures A and B so that the objective's back focal plane would, as illustrated in FIG. 2, be illuminated by four virtual apertures $A_1$, $B_1$, $A_2$ and $B_2$, the two virtual apertures $A_2$ and $B_1$ being close to or on the optical axis of the arrangement while the other two virtual apertures $A_1$ and $B_2$ are diametrically separated from one another at equal distances from that axis. In this case, the virtual apertures $A_2$ and $B_1$ provide the light pencils incident at $\theta_1$ while the virtual apertures $A_1$ and $B_2$ provide the light pencils incident at $\theta_2$. The distance $s$ between $A_1$ and $A_2$ (which is equal to the distance between $B_1$ and $B_2$) represents the lateral shear imparted to the incident light by the wave-shearing beam-splitter employed. Following reflection of this light and subsequent recombination of the laterally sheared components thereof the result illustrated in FIG. 3 is obtained, where it is seen that the images of the apertures A and B are now recombined whilst the objective's pupil is sheared.

Figure 4:
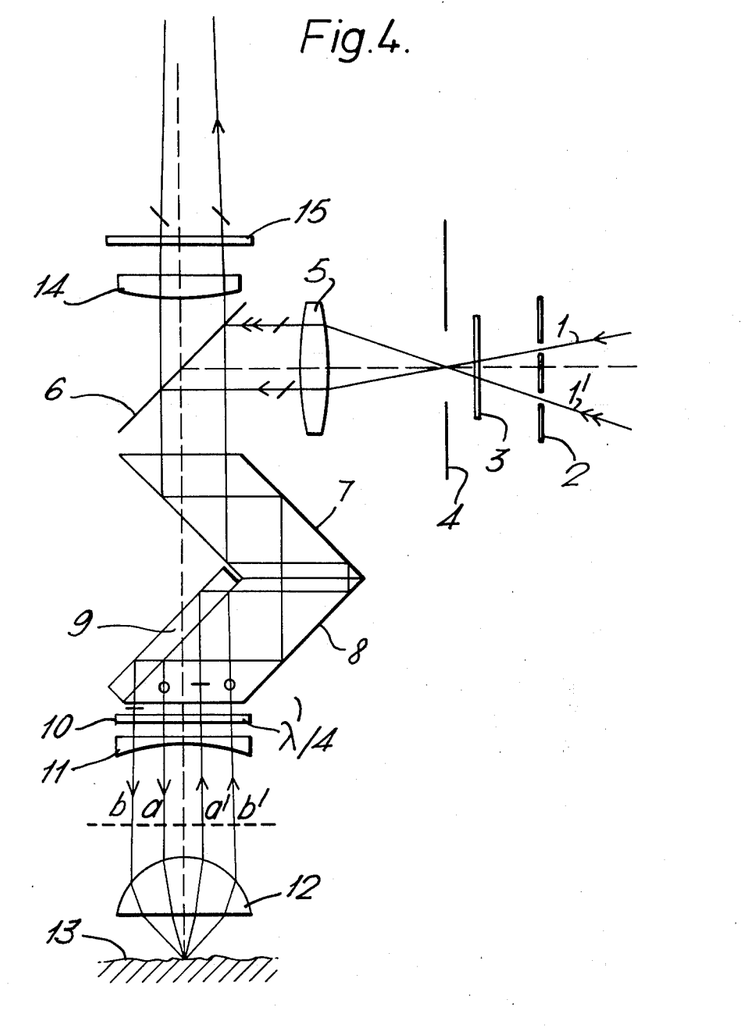
FIG. 4 illustrates the construction of part of the micro-interferometer.

The pupil-shearing micro-interferometer of which part is illustrated in FIG. 4 employs an illuminating aperture system corresponding to that described in the previous paragraph. In this micro-interferometer, a lamp and associated condenser (not shown) are employed to illuminate two slot-form apertures 1 and 1' of an aperture stop 2. Pencils of light respectively radiating from the apertures 1 and 1' are directed through a polarizer 3, a field diaphragm 4 and a converging field-lens 5 towards a semi-reflecting plate 6 inclined at 45° to a central optical axis defined by the elements 2, 3, 4 and 5. The polarizer 3 is oriented diagonally so that light emerging therefrom is polarized in a plane diagonal to the plane of FIG. 1. The semi-reflecting plate 6 reflects the pencils of light incident thereon downwards into a first rhomboidal prism 7 so they respectively suffer total internal reflection successively at two opposite faces of the prism and then pass into a second, like rhomboidal prism 8 adjoining the first in mirror-image relationship. After a first total internal reflection at one face of the rhomboidal prism 8, each pencil of light travels towards a Jamin interferometer plate 9 cemented to the opposite face of the prism with the interposition of a beam-splitting polarizing film. Each pencil of light which is directed towards the Jamin interferometer plate 9 is amplitude-divided into a first light pencil such as $a$, which is internally reflected at the interface between the prism 8 and the Jamin plate 9, and a second light pencil such as $b$, which is totally internally reflected at that face of the Jamin plate which is remote from the prism 8. Because of the presence of the polarizing film between the prism 8 and the Jamin plate 9, one of each pair of light pencils such as $a$ and $b$ is plane-polarized at right angles to the other light pencil of the pair. Each pair of light pencils such as $a$ and $b$ passes out of the prism 8 through a quarter-wave plate 10 (serving as polarization exchanging means) and a succeeding negative corrector lens 11 to an objective lens 12 which focuses the light pencils onto a point on a specimen surface 13 under investigation. The light compoents in each pair of light pencils such as *a* and *b* focused onto the surface 13 are potentially coherent, having been formed from a common input pencil by amplitude-division, but are incident on the surface 13 at different respective angles of incidence determined by the degree of lateral shear between the light pencils in each such pair. At the surface 13 the light pencils such as *a* and *b* are respectively reflected so as to produce reflected light pencils such as *a'* and *b'*. The reflected light pencils such as *a'* and *b'* are collected by the objective lens 12 and directed through the corrector lens 11 and the quarter-wave plate 10 into the rhomboidal prism 8. Because of double passage through the quarter-wave plate 10, each reflected light pencil such as *a'* entering the prism 8 is plane-polarized at right angles to the corresponding incident light pencil *a*, and each reflected light pencil such as *b'* is polarized at right angles to the corresponding incident light pencil *b*. For this purpose, the quarter-wave plate 10 is oriented diagonally relative to the vibration directions of the light pencils passing through it.

On reaching the interface between the prism 8 and the Jamin plate 9, each reflected light pencil such as *b'* comes into axial coincidence with a reflected light pencil such as *a'* that has passed through the prism 8 and been totally internally reflected at that face of the Jamin plate 9 remote from the prism 8. The single, composite pencil of reflected light thereby produced is internally reflected in the prism 8 so as to pass into the rhomboidal prism 7 whereafter, as a consequence of two internal reflections in the prism 7, the composite pencil of light is directed out of the prism 7. After leaving the prism 7, such composite pencils of reflected light pass through the semi-reflecting plate 6, a telescope corrector lens 14 and a crossed analyzer 15 towards an image plane of a conventional microscope (not shown).

Since the optical path difference between each pair of reflected light pencils such as *a'* and *b'* varies, as will be apparent from the description of FIG. 1, with variation in the distance from a reference plane (e.g. a focal plane of the objective lens 12) of that point on the surface 13 onto which the incident light is focused, the optical assembly illustrated in FIG. 4 permits, in combination with a suitable microscope, interferometric investigation of the topography of the surface 13.

Polarized light is employed in the optical assembly of FIG. 4 in order to suppress the extra pair of incoherent light pencils which would otherwise be produced from each pair of reflected light pencils such as *a'* and *b'* on passing through the combination of the prism 8 and the Jamin plate 9. (In a conventional Jamin interferometer, beam separation is generally sufficient for extra such pairs of incoherent light pencils to be masked out by stops or by suitable restriction of plate length). The two component waves contained in each composite pencil of light passing to the analyzer 15 are polarized in mutually perpendicular planes. Accordingly, these waves do not actually interfere until respective components thereof having a common plane of polarization emerge from the analyzer 15.

The negative corrector lens 11 associated with the objective lens 12 serves to correct the objective lens for infinite tube-length. The corrector lens 11 should be specially designed to minimize flare and be multi-layer anti-reflection coated. The quarter-wave plate 10 could be somewhat titled, as could the combination of the rhomboidal prisms 7 and 8 and the Jamin plate 9. It might conceivably be possible to dispense with the negative corrector lens 11 if the Jamin plate 9 were made slightly wedge-shaped so that pairs of coherent light pencils would intersect virtually at a point conjugate with the image plane.

The dashed line drawn between the corrector lens 11 and the objective lens 12 indicates the back focal plane of the objective lens. It is at this plane that the apertures 1 and 1' of the stop 2 are imaged. Assuming that the apertures 1 and 1' are respectively constituted by symmetrically arranged parallel slot-form apertures such as the apertures A and B mentioned in connection with FIGS. 2 and 3, the distribution of illumination at the back focal plane of the objective lens 12 will be substantially as indicated in FIG. 2.

Figure 5:
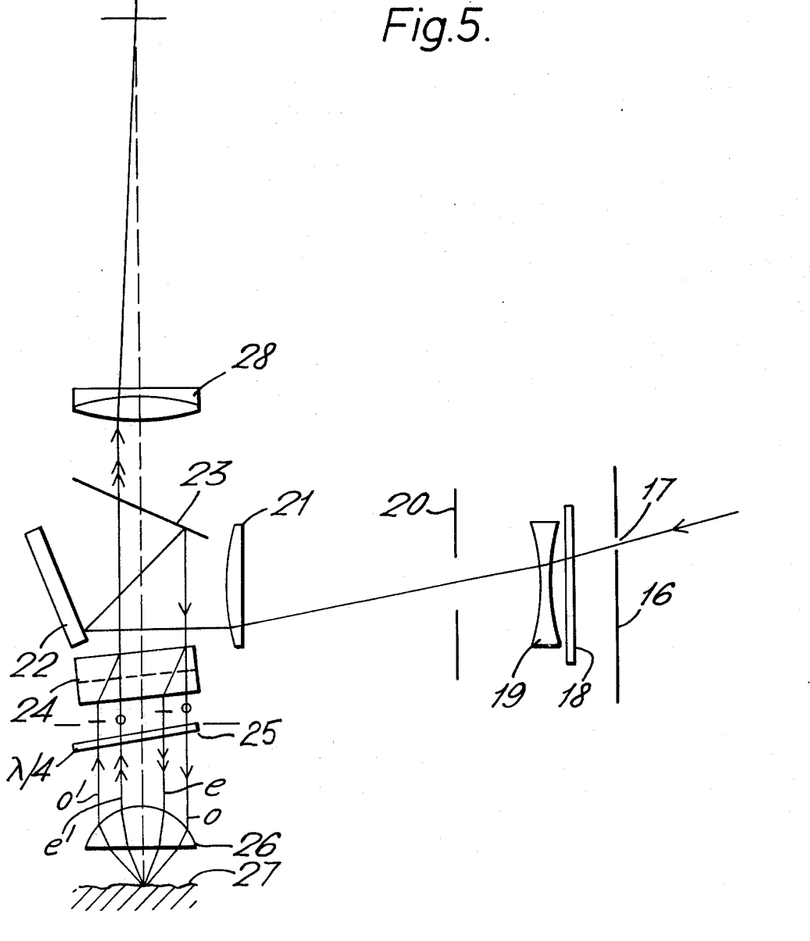
FIG. 5 illustrates the construction of part of a second form of pupil-shearing micro-interferometer embodying the invention.

The pupil-shearing micro-interferometer of which part is illustrated in FIG. 5 effects wave-shearing by means of double refraction.

In the case of FIG. 5, a lamp (not shown) illuminates a slit-form aperture 17 in an aperture stop 16. Light from the illuminated aperture 17 travels through a diagonally oriented polarizer 18 and a succeeding diverging lens 19 (not essential) to a convergent field-lens 21, the field of illumination being limited by a field diaphragm 20 located between the lenses 19 and 21. The light received by the converging lens 21 is directed towards a plate 22 which reflects light incident thereon towards a semi-reflecting plate 23 which reflects a proportion of that light into a double-refracting plate 24 made of optical-quality calcite. As indicated by the broken line drawn across the plate 24 in FIG. 5, instead of being formed of a single block of calcite this plate can take the form of a Savart-doublet bi-refringent plate. Alternatively, the calcite plate 24 may be replaced by some other form of bi-refringent plate.

A pencil of light directed into the calcite plate 24 by the semi-reflecting plate 23 is amplitude-divided so as to produce an ordinary light pencil *o* and an extraordinary light pencil *e* which emerge from the calcite plate laterally sheared relative to one another. (If some other form of bi-refrigent plate is employed, the light pencils produced by amplitude-division will not necessarily be an ordinary light pencil and an extraordinary light pencil, however.) Pairs of such ordinary and extraordinary light pencils emerging from the calcite plate 24 are directed through a quarter-wave plate 25 (serving as polarization exchanging means) to an infinity-corrected objective lens 26 serving to focus these pencils to a point on a specimen surface 27 under investigation. As seen in FIG. 5, the planes of the calcite plate 24 and the quarter-wave plate 25 are respectively inclined somewhat to the optical axis of the arrangement.

Each ordinary light pencil *o* and the asscoiated extraordinary light pencil *e* focused onto the specimen surface are potentially coherent and are incident on the surface at different respective angles of incidence. Reflection of each pair of ordinary and extraordinary light pencils *o* and *e* directed onto the surface of the surface 27 gives rise to corresponding reflected light pencils *o'* and *e'* which are collected by the objective lens 26 and directed through the quarter-wave plate 25 into the calcite plate 24. In the calcite plate 24 the reflected light pencils *o'* and *e'* are combined so as to produce a single composite pencil of reflected light emerging from the calcite plate 24.

This combination occurs because, owing to the presence of the quarter-wave plate 25, the plane of polarization of a reflected light pencil such as *o'* produced from an incident light pencil such as o is perpendicular to the plane of polarization of the incident pencil, while the plane of polarization of a reflected light pencil such as e' produced from an incident light pencil such as the pencil e is perpendicular to the plane of polarization of the latter incident light pencil.

The single composite pencil of reflected light emerging from the calcite plate 24 is directed through the semi-reflecting plate 23 to a telescope objective lens 28 which directs the pencil through an analyzer (not shown) to an eye-piece (also not shown). Since the optical path difference between each incident ordinary light pencil and the associated extraordinary light pencil directed towards a point on the surface 27 varies with variation in the distance of that point from a reference plane (e.g. a focal plane of the objective lens 26) the optical assembly illustrated in FIG. 5 can, in combination with the eyepiece and analyzer not illustrated, be employed for interferometric investigation of the topography of the surface.

Figure 6:
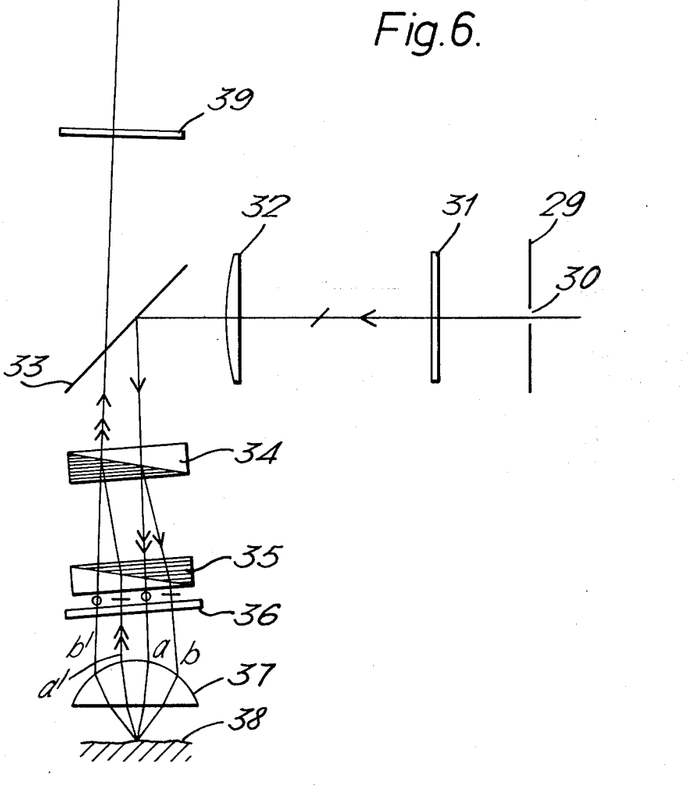
FIG. 6 illustrates the construction of part of a third form of pupil-shearing micro-interferometer embodying the invention.

The pupil-shearing micro-interferometer of which part is illustrated in FIG. 6 also employs a bi-refraction technique to effect wave-shearing but requires less bi-refringent material than does the micro-interferometer described with reference to FIG. 5.

In the case of FIG. 6, a pencil of light from a small real or virtual source, for example an illuminated aperture 30 of a stop 29, is polarized by a polarizer 31 in a plane diagonal to the plane of the figure, as in the case of the light pencil emerging from the illuminated aperture 17 in FIG. 5. The plane-polarized pencil of light emerging from the polarizer 31 travels to a converging field-lens 32 which directs the pencil onto an inclined semi-reflecting plate 33 which reflects part of the light thereon successively through a pair of bi-refringent doublet prisms 34 and 35. A pencil of light reflected towards the first doublet prism 34 from the semi-reflecting plate 33 is thus divided into a pair of differently polarized light pencils a and b angularly sheared relative to one another. After passing through the second doublet prism 35, the light pencil a and the light pencil b are sheared laterally relative to one another so as to pass, by way of a quarter-wave plate 36 (serving as polarization exchanging means) succeeding the doublet prism 35, through different zones of an objective lens 37 arranged to focus the light pencils to a point on a surface 38 under investigation. Reflection of each pair of differently polarized light pencils a and b at the surface 38 produces a corresponding pair of reflected light pencils a' and b' which are collected by the objective lens 37 and directed successively through the doublet prisms 35 and 34 after passage through the quarter-wave plate 36. By virtue of the exchange of vibration directions imparted by double transmission through the quarter-wave plate 36, the passage of each pair of reflected light pencils a' and b' through the doublet prisms 34 and 35 causes recombination of the light pencils so as to produce a single composite pencil of reflected light which contains two component waves plane-polarized at right angles to one another. On emerging from the doublet prims 34, each such composite pencil of light passes through the semi-reflecting plate 33 and an analyzer 39 towards a microscope eye-piece.

The analyszer is orientated diagonally relative to the respective planes of polarization of the two component waves in each composite pencil of light reaching the analyzer. Respective components of these component waves thus emerge from the analyzer 39 polarized in a common plane; they can thus interfere optically with one another. The analyzer (not shown) of the micro-interferometer described with reference to FIG. 5 serves the same purpose.

By making the beam-deviating power of the lower doublet prism 35 slightly less then the beam-deviating power of the upper doublet prims 34, the effective point of shear can be located at the long conjugate of the lens 37, thereby avoiding the need for a corrector lens above this objective lens.

Figure 7:
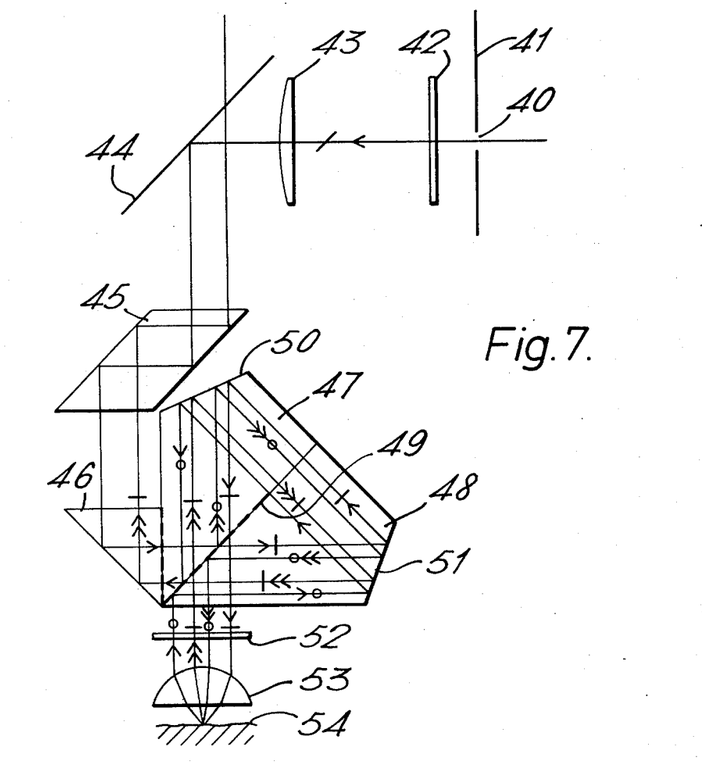
FIG. 7 illustrates the construction of part of a fourth form of pupil-shearing micro-interferometer embodying the invention.

The pupil-shearing micro-interferometer of which part is illustrated in FIG. 7 does not make use of bi-refringence to effect wave-shearing and recombination. In the case of the optical assembly illustrated in FIG. 7, a pencil of light emanating from a small real or virtual source, for example an illuminated aperture 40 of a stop 41, is plane-polarized by a polarizer 42 so that the pencil emerges from the polarizer with its vibration diagonal to the plane of the figure. After passing through the converging field-lens 43 the pencil is reflected by a semi-reflecting plate 44 into one face of a rhomboidal prism 45. After two total internal reflections in the prism 45, the pencil of light travels out of the prism 45 into one face of a triangular prism 46 which reflects the pencil into a lateral shearing element consisting of two similar "half-pentagonal" quadrilateral prisms 47 and 48, both made from optical glass. The quadrilateral prisms 47 and 48 are cemented together so as to form a pentagonal prism, this being possible because the cross-section of each of the prisms 47 and 48 contains a right angle. Because adjacent corners of the prisms 47 and 48 are respectively 45° in cross-section, the pentagonal prism 47, 48 also contains a corner which is a right angle in cross-section, this corner being intersected by the plane of the interface between the prisms 47 and 48. While the prisms 47 and 48 are alike as regards the shape and size of their common interface and have the same angles in cross-section, the prism 48 is somewhat larger than the prism 47.

Those faces 50 and 51 of the prisms 47 and 48 that are remote from the common interface between these prisms are silvered. Moreover, the cemented interface between the prisms 47 and 48 in part contains a polarizing thin-film combination 49. Consequently, a pencil of light reflected from the triangular prism 46 normally into an adjacent face of the pentagonal prism 47, 48 is amplitude-divided at the common interface between the prisms 47 and 48 so that a reflected light pencil travels to the silvered face 50 of the prism 47 while a transmitted light pencil plane-polarized at right angles to the reflected light pencil travels towards the silvered face 51 of the prism 48. The light pencil travelling towards the silvered face 50 is reflected from that face to the silvered face 51, from which it is reflected towards the common interface between the prisms 47 and 48 and there suffers reflection out of the pentagonal prism 47, 48. The transmitted light pencil travelling towards the silvered face 51, on the other hand, is there reflected to the silvered face 50, from which it is reflected out of the pentagonal prism 47, 48 after transmission through the interface between the component prisms 47 and 48.

In view of the difference in size between the prisms 47 and 48, the light pencil (indicated by single-barbed arrows) which undergoes an anti-clockwise path of successive reflection in the prism 47, 48 is laterally sheared relative to the light pencil (indicated by double-barbed arrows) which undergoes a clockwise path of reflection within the prism 47, 48. After travelling through a quarter-wave plate 52 (serving as polarization exchanging means), these two laterally sheared light pencils travel through different zones of an objective lens 53 which therefore converges them into a point on a surface 54 under investigation in such manner that they meet the surface at different respective angles of incidence. After reflection at the surface 54, the light pencils once more re-enter the pentagonal prism 47, 48 after return passage through the quarter-wave plate 52. Owing to the presence of the quarter-wave plate 52, the plane of polarization of each reflected light pencil entering the prism 47, 48 is perpendicular to the plane of polarization of the corresponding incident light pencil previously leaving that prism. After successive reflection at the interface between the prisms 47 and 48, the silvered face 51, the silvered face 50 and a second reflection at the interface, one of the light pencils entering the prism 47, 48 after reflection at the surface 54 comes into axial coincidence with the other of the light pencils reflected from the surface 54, since on entering the prism 47, 48 that other light pencil is transmitted through the interface, successively reflected at the silvered faces 50 and 51 and again transmitted through the interface. The laterally-sheared reflected light pencils travelling from the surface 54 are thus combined so that a single composite pencil of light reflected from the surface 54 travels from the pentagonal prism 47, 48 into the triangular prism 46.

The composite pencil of light entering the triangular prism 46 from the pentagonal prism 47, 48 is reflected into the rhomboidal prism 45 and, after two total internal reflections in the latter prism, emerges from the prism 45 so as to pass through the semi-reflecting plate 44 towards an analyzer (not shown) and thence towards an image plane of a conventional microscope (also not shown). Since the optical path difference between two laterally-sheared light pencils reflected from a point on the surface 54 varies with variation in the distance of that point from a reference plane (e.g. a focal plane of the objective lens 53) the optical assembly illustrated in FIG. 7 can, in combination with the analyzer and microscope mentioned, be employed for interferometric investigation of the topography of the surface 54. The analyzer serves to pass components polarized in a common plane of the respective component waves, plane-polarized at right angles to one another, contained in the composite pencil of light transmitted to the analyzer through the semi-reflecting plate 44.

Correction of the objective lens 53 for infinite tube-length may be effected by means of a telescope objective lens arranged to converge the composite pencil of light to the required real image. As in the case of the arrangement illustrated in FIG. 4, such a telescope objective lens may appropriately be located below the analyzer. Alternatively, the objective lens 53 could have a normal, finite tube-length, in which case a suitable negative tube-length corrector lens could be inserted between the pentagonal prism 47, 48 and the objective lens 53.

It will be appreciated that since only four of the five main faces of the composite prism 47, 48 formed by the component prisms 47 and 48 are employed in the FIG. 7 arrangement, it is not strictly necessary for the composite prism used to be pentagonal or for the component prisms forming it to be quadrilateral. All that is necessary is a composite prism providing closed-loop paths in opposite senses for the two light pencils into which an incident pencil is divided at the interface between the component prisms.

The pupil-shearing micro-interferometers respectively described with reference to FIGS. 4 to 7 are, to a greater or lesser extent, compatible with the use of conventional incident-light microscopes employing standard objectives. Thus, in contrast to current shearing interferometers, employed for testing microscope objectives, essentially comprising a double-refracting double-image prism mounted in the double-pass mode at the orthoscopic image-plane of an objective, optical assemblies such as illustrated in FIGS. 4 to 7 are compatible with the layout of a conventional microscope in which orthoscopic image planes are usually inaccessible and incident illuminators are arranged between image plane or planes and the objective. Moreover, an optical assembly such as those illustrated in FIGS. 4 to 7 could be housed in an interferometric unit which is interchangeable with a standard incident illuminator-cum-nosepiece of a microscope. The objective lens of the assembly could be carried by a rotatable nosepiece changer, as in the case of conventional incident illuminators, the nosepiece changer being fitted to the lower end of the interferometric unit, however.

With an optical assembly such as illustrated in FIG. 6, in which the need for a telescopic corrector lens above the incident illuminator may be avoided, it may provide possible to fit the assembly as a unit to the lower, outlet end of an existing incident illuminator unit already attached to a microscope. An aperture diaphragm defining one or more illuminating apertures for the illuminator could be fitted to an external lamp or be carried at one end of a sleeve adapted to fit onto an inlet tube of the illuminator.

An optical assembly such as those illustrated in FIGS. 4 to 7 would appear to offer the possibility of extending the effective displacement range of incident light micro-interferometry without the need for reference surfaces or specially-designed objectives. While the interference colours produced in white light would be anomolous due to residual chromatic aberration of the objective lens 12, 26, 37 or 53, this problem could be avoided by using a monochromatic light source, for example a mercury vapour lamp.

It will be appreciated that the mutiple reflections which an incident pencil of light undergoes in its path to the wave-shearing elements of the optical assemblies illustrated in FIGS. 4, 5 and 7 are not essential. However, such reflections permit a reduction in the size of the optical assemblies to be achieved without corresponding reduction in optical path lengths.

Pupil-shearing micro-interferometers such as described with reference to FIGS. 4 to 7 may be employed both for qualitative and for quantitative examination of surface topography.

However, in the various forms of micro-interferometer described with reference to FIGS. 4 to 7 a double-beam interference image is generated in which the topography of the surface under examination is revealed in terms of interference contrast. The quantitative assessment of the surface is therefore somewhat subjective.

In conventional micro-interferometers this difficulty is usually obviated by so adjusting the interferometer system that the optical path relationship between mutually-interfering light pencils at the image plane changes linearly across the field of view, thus generating a system of straight, parallel fringes. Surface profile variations can then be measured by noting the transverse fringe displacements which they cause. For example, a bi-refringent wedge could be inserted in the vicinity of field diaphragm 20 in the case of FIG. 5. The wedge would be arranged so that its two mutually perpendicular extinction directions are substantially in orthogonal relation to the vibration directions of the polarizing interferometer system.

Alternatively, the required fringes may be generated by inserting a bi-refringent fringe-generating device, e.g. a Savart plate, between the semi-reflecting plate 23 and the telescope objective lens 28 of FIG. 5. Such a device would produce straight fringes at infinity, and these would therefore be focused at the orthoscopic image plane by the lens 28.

However, the fringe-generating procedure outlined above is not directly applicable when the two-aperture method of illumination discussed above with reference to FIGS. 2 and 3 is used, as in the case of FIG. 4. This is because the diametrically corresonding virtual apertures $A_1$ and $B_2$ of FIG. 2 are differently polarized, i.e. either they are linearly polarized in mutually perpendicular directions or they are circularly polarized in opposite senses. The same applies to the apertures $A_2$ and $B_1$. It is necessary, however, that the linearly-changing optical path relationship generated by a bi-refringent fringe-producing device should operate equally upon the apertures $A_1$ and $B_2$ in relation to the apertures $A_2$ and $B_1$. This means that the 'fast' and 'slow' vibration directions of the bi-refringent fringe-generating device employed must be rotated through 90° for one side of the illuminated pupil relative to the other. The modified illumination system illustrated in FIG. 8 can be employed for this purpose, which system uses a half-wave plate in association with a bi-refringent fringe-generating device.

Figure 8:
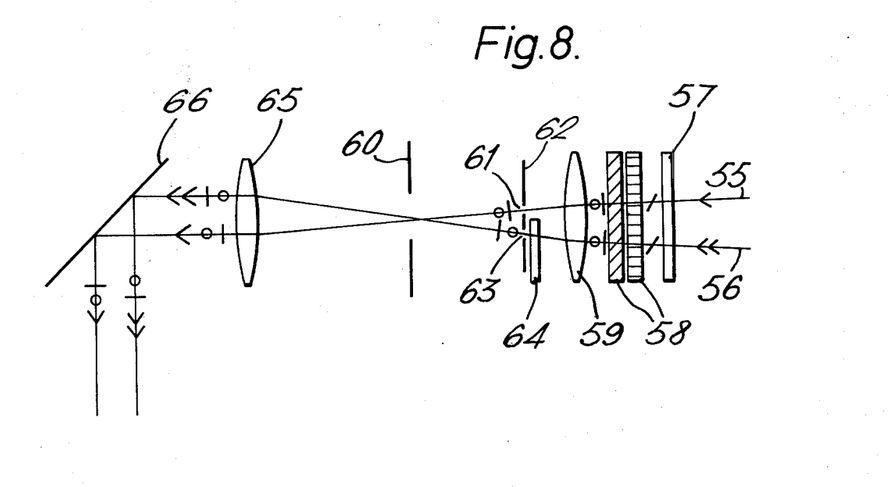
FIG. 8 illustrates a modified illumination system for a micro-interferometer embodying the invention.

In this system an illuminating beam containing two laterally separated incident light pencils 55 and 56 (respectively indicated by single-barbed and double-barbed arrows) is first linearly polarized diagonally by a polarizer 57 and then passes through a Savart doublet plate 58 which produces straight fringes at infinity when the light emerging from the interferometer system of a micro-interferometer incorporating the modified illumination system is ultimately viewed through an analyzer). A telescope lens 59 then focuses these potential fringes into the aperture of a field diaphragm 60. The single-barbed pencil 55 passes straight through an upper aperture 61 of a double-aperture diaphragm 62, with the two vibration components (generated by the Savart plate) unmodified. However, the corresponding vibration components of the double-barbed pencil 56 passing through a lower aperture 63 of the diaphragm 62 are rotated through 90° by a bi-refringent half-wave plate 64 (serving as polarization exchanging means) interposed between the Savart plate 58 and the aperture diaphragm 62. Thus, the compensation condition, due to the Savart plate, is applied to the two apertures in mutually perpendicular senses, so as to match the corresponding situation which is inherently associated with a polarizing, shearing interferometer system. The two illuminating light pencils respectively emerging from the apertures 61 and 63 travel through the field diaphragm 60 to a field lens 65 and are thereafter deflected by a semi-reflecting plate 66 towards a shearing interferometer system of a micro-interferometer embodying the invention, e.g. an interferometer system such as illustrated in FIG. 4.

It will be appreciated that the fringe-generating device, i.e. the plate 58, could in principle be located in the path of the incident light pencils 55 and 56 downstream of the diaphragm 62, and that the half-wave plate 64 could also be located elsehwere as long as it remains in the path of one alone of these two pencils. However, the half-wave plate should always be downstream of the fringe-generating device.

What is claimed is:

1. Interferometric apparatus comprising an optical assembly for simultaneously directing two mutually coherent light pencils at different respective angles of incidence towards a point on a surface under investigation and receiving reflected light pencils respectively produced by reflection of the two mutually coherent light pencils at that surface, the optical assembly including optical means for bringing the reflected light pencils at least partially into co-incidence with one another so that the reflected light pencils can interfere optically with one another in a manner which varies with variation in the distance of points on the surface from a reference plane.

2. Apparatus as claimed in claim 1, wherein the said optical means additionally serve to produce the two mutually coherent light pencils by amplitude-division of an incident light pencil directed onto the optical means when the apparatus is in use.

3. Apparatus as claimed in claim 2, wherein the said optical means comprise a Jamin interferometer plate arranged to divide such an incident light pencil into the two mutually coherent light pencils, and an objective lens arranged to direct the two mutually coherent light pencils towards a surface under investigation and to collect the said reflected light pencils and direct them towards the Jamin interferometer plate to be combined into a single light pencil.

4. Apparatus as claimed in claim 2, wherein the said optical means comprise a bi-refringent optical element arranged to produce the two mutually coherent light pencils by dividing such an incident light pencil into two differently polarized light pencils, an objective lens arranged to direct the differently polarized light pencils onto a surface under investigation and to collect the said reflected light pencils and direct them towards the bi-refringent optical element to be combined into a single light pencil, and polarization exchanging means arranged to ensure that the said reflected light pencils are so polarized as to be combined into such a single light pencil by the bi-refringent optical element.

5. Apparatus as claimed in claim 4, wherein the polarization exchanging means comprise a quarter-wave plate arranged in the path both of the two mutually coherent light pencils and of the said reflected light pencils.

6. Apparatus as claimed in claim 4, wherein the bi-refringent optical element is a calcite plate.

7. Apparatus as claimed in claim 4, wherein the bi-refringent optical element is a bi-refringent doublet.

8. Apparatus as claimed in claim 7, wherein the bi-refringent doublet is a bi-refringent doublet prism.

9. Apparatus as claimed in claim 7, wherein the bi-refringent doublet is a Savart-doublet bi-refringent plate.

10. Apparatus as claimed in claim 8, including an additional such doublet prism arranged in the path both of the two mutually coherent light pencils and of the said reflected light pencils, the additional doublet prism having a beam deviating power less than that of the other doublet prism.

11. Apparatus as claimed in claim 2, wherein the said optical means comprise two non-identical component prisms joined together to form a composite prism with a partially-reflecting, partially-transmitting interface between the component prisms, the composite prism being arranged so that such an incident light pencil passes into it through a first face of one component prism and is divided at the interface into two component light pencils, one component light pencil being reflected at a second face of the said one component prism and subsequently reflected at a corresponding face of the other component prism back to the interface to be reflected out of the composite prism via that face of the said other component prism corresponding to the said first face, and the other component light pencil being reflected at that fact of the said other component prism corresponding to the said second face and subsequently reflected at the said second face back to the interface to be reflected out of the composite prism, via that face of the said other component prism corresponding to the said first face, laterally sheared relative to the said one component light pencil, part of the interface containing a polarizing thin film for ensuring that the component light pencils are plane-polarized at right angles to one another on leaving the composite prism, the optical means further comprising an objective lens arranged to direct the two component light pencils leaving the composite prism towards a surface under investigation and to collect the said reflected light pencils and direct them towards the composite prism to be combined into a single light pencil, and polarization exchanging means arranged to ensure that each of the said reflected light pencils enters the composite prism plate-polarized at right angles to that one of the said two component light pencils from which it is produced.

12. Apparatus as claimed in claim 4, including a bi-refringent fringe-generating device arranged in the path of such an incident light pencil onto the optical means.

13. Apparatus as claimed in claim 4, including a bi-refringent fringe-generating device arranged in the path of the single light pencil produced by combination of the said reflected light pencils.

14. Apparatus as claimed in claim 2, wherein the optical assembly additionally serves for simultaneously directing a further two such mutually coherent light pencils towards the surface under investigation, at different respective angles of incidence, in mirror-image relationship to the first-mentioned two mutually coherent light pencils and for receiving further reflected light pencils respectively produced by reflection of the said further two mutually coherent light pencils at that surface, the said optical means additionally serving to produce the said further two mutually coherent light pnecils by amplitude-division of a further such incident light pencil directed onto the optical means when the apparatus is in use and to bring the said further reflected light pencils at least partially into coincidence with one another so that the said further reflected light pencils can also interfere optically with one another in a manner which varies with variation in the distance of points on the surface from the said reference plane.

15. Apparatus as claimed in claim 14, including a bi-refringent fringe-generating device arranged in the path of both incident light pencils directed onto the said optical means, and a half-wave plate arranged in the path of one alone of those incident light pencils.

16. Apparatus as claimed in claim 15, including an optical diaphragm having two apertures which respectively serve to provide the incident light pencils for the said optical means when an incident light beam is directed onto the diaphragm, a bi-refringent fringe-generating device arranged in the path of the incident light beam, and a half-wave plate arranged in the path of one alone of the incident light pencils respectively provided by the said two apertures of the diaphragm.

\* \* \* \* \*